Patented Sept. 13, 1932

1,877,676

UNITED STATES PATENT OFFICE

JOHN A. LOCKWOOD, OF FILLMORE, NEW YORK

COMPOUND FOR PREVENTING CANNIBALISM IN CHICKENS

No Drawing.   Application filed July 22, 1930. Serial No. 469,936.

This invention relates to a medicinal compound for use upon poultry for the purpose of discouraging cannibalistic tendencies exhibited by chickens when one of their number becomes injured.

It is well known by poultry raisers that when a chicken in a flock becomes injured in any manner or picks herself as incubator chickens frequently do, so that blood is drawn, the other members of the flock will peck at the sore and the blood with the result that the injured chicken is finally killed.

The compound embodying the present invention has for its primary object to prevent this practice and in addition to provide a healing preparation for the sore to which it is applied.

Another object of the invention is to provide a compound for the above described purpose which will have the appearance of blood, it being applied to the sores which have developed upon the chicken and also to other parts of the chicken's body so that other chickens will peck at the medicine in the belief that it is blood from the body of the injured chicken and the compound has therein substances which will be distasteful to the chickens so that when the chickens which have had a taste of the compound again see an injured chicken they will be restrained from pecking it for fear of getting the unpleasant taste associated with the supposed blood which they had previously tasted.

The compound embodying the present invention has as its principal ingredient the chemical chlorazene or chloramine, the correct chemical name for which is para-toluene-sodium-sulphochloramide. This chemical acts as an antiseptic and healing agent and also imparts together with the other ingredients an unpleasant taste to the compound.

The compound when prepared for use is of a rather stiff or viscid character so that it will readily adhere to the body and feathers of the chicken to which it is applied.

The following is the formula for approximately eighteen ounces of the compound:

Chloramine U. S. P _____ 28 grains
Glycerine _____ 6 fluid ounces
Valerian extract _____ 1 ounce
Carbolic acid _____ 2 drops
Creosote _____ 4 drops
Tincture of iodine _____ ½ fluid ounce
Tincture of aconite _____ ½ fluid ounce
Red vermilion _____ 3 ounces
Plaster of Paris (very fine)_ 7 ounces In the mixing or compounding of the preparation the chloramine is dissolved in the glycerine with the aid of heat. As soon as solution of the chloramine is obtained the valerian extract, carbolic acid, creosote, tincture of iodine and tincture of aconite are stirred in, in the order named. The two powders vermilion and plaster of Paris, having been previously mixed, are then incorporated in the liquid.

The glycerine is employed as a solvent and also for the reason that it keeps the preparation fluid or moist over a relatively long period of time and also for the reason that it will readily adhere to the feathers and to the skin of the chicken and will mix freely with the blood in a wound to which it may be applied, it having been found in actual practice that the compound has remained on a chicken feather to which it is applied for a period of approximately four weeks without drying out and without losing its appearance of partly congealed blood.

The valerian is used because of its peculiarly offensive odor and taste, it being distasteful to the majority of farm animals and fowls.

The carbolic acid and creosote are also distasteful to the chickens and in addition are healing as is the iodine also.

The aconite being analgesic prevents discomfort which may otherwise result from irritation of a wound by the other ingredients of the preparation. The vermilion, of course, is used to give to the compound a blood red color and the plaster of Paris gives body to the compound.

The combination of elements set forth in this compound have produced as a result of actual experiments results in the healing of wounds to which applied which is more than the sum total of the results which would be obtained if used separately.

In addition to this the ingredients in combination give a compound which is particularly distasteful to fowls and after they have once tasted the same they will be deterred from again pecking at anything resembling blood upon another chicken, the vermilion of the compound giving to it a marked resemblance to blood.

In addition to the fact that certain of the elements of the compound are in themselves distasteful and in addition to the fact that certain of the elements are in themselves healing to wounds it is believed that there is a union of several of the ingredients, particularly the chloramine, iodine and creosote which improves the healing qualities of the compound and also adds to the distastefulness of the same to the chickens.

Having thus described my invention, what I claim is:

1. A blood simulating compound of the character and for the purpose described, comprising a semi-fluid body of a character to adhere to the feathers and body of a chicken, colored to represent blood and having chloramine as the principal ingredient.

2. A blood simulating compound of the character and for the purpose described, comprising a semi-fluid body made up of plaster of Paris and glycerine forming a base, a blood like coloring material, and a substance of disagreeable taste to fowls, having chloramine as the principal ingredient.

3. A compound of the character and for the purpose described, comprising a blood colored non-drying, semi-fluid body of a character to adhere to the feathers and skin of fowls, and a substance disagreeable to the taste of fowls incorporated therewith.

In testimony whereof I hereunto affix my signature.

JOHN A. LOCKWOOD.